(12) United States Patent
Lee et al.

(10) Patent No.: US 7,988,821 B2
(45) Date of Patent: Aug. 2, 2011

(54) PROCESS FOR THE TREATMENT OF FIBRE MATERIAL AND NEW COMPOSITION

(75) Inventors: Seung-Hoon Lee, Anyang (KR); Jonni Ahlgren, Vaasa (FI); Jukka Jäkärä, Siivikkala (FI); Aarto Parén, Vaasa (FI); Jukka Rautiainen, Espoo (FI); Ilkka Renvall, Espoo (FI)

(73) Assignee: Kemira Oyj (FI)

( * ) Notice: Subject to any disclaimer, the term of this patent is extended or adjusted under 35 U.S.C. 154(b) by 682 days.

(21) Appl. No.: 10/587,564

(22) Filed: Jun. 13, 2007

(65) Prior Publication Data

US 2008/0035287 A1 Feb. 14, 2008

(30) Foreign Application Priority Data

Feb. 25, 2004 (FI) ...................................... 20040293

(51) Int. Cl.
*D21C 3/20* (2006.01)
(52) U.S. Cl. ................ 162/76; 162/5; 162/78; 210/698; 210/700; 252/180; 525/206
(58) Field of Classification Search ................ 162/5, 76, 162/78; 210/698, 700; 252/180; 525/206
See application file for complete search history.

(56) References Cited

U.S. PATENT DOCUMENTS

| 4,363,699 A | | 12/1982 | DeCeuster et al. | |
|---|---|---|---|---|
| 4,963,157 A | | 10/1990 | Machida et al. | |
| 5,135,677 A | * | 8/1992 | Yamaguchi et al. | 252/180 |
| 5,658,429 A | * | 8/1997 | Andersson et al. | 162/65 |
| 5,760,150 A | | 6/1998 | Bachus | |
| 6,780,832 B1 | * | 8/2004 | Maeda et al. | 510/477 |

FOREIGN PATENT DOCUMENTS

| CA | 2441841 A1 | 3/2004 |
|---|---|---|
| DE | 3423452 A1 | 1/1986 |
| EP | 0814193 A2 | 12/1997 |
| WO | 9011403 A1 | 10/1990 |
| WO | 2005108673 A1 | 11/2005 |

OTHER PUBLICATIONS

Finnish Application No. 20040293; Search Report.
International Application No. PCT/FI2005/000113; Search Report.
JP 01-266295; Publication Date: Oct. 24, 1989 (translation of abstract only).
JP 01-148890; Publication Date: Jun. 12, 1989 (translation of abstract only).
JP 60-231876; Publication Date: Nov. 18, 1985 (translation of abstract only).
DE 3423452; Publication Date: Jan. 2, 1986 (translation of abstract only).
JP1266295; Oct. 24, 1989; Machine Translation (8 pages).
FI20040293; Sep. 29, 2004; Search Report (1 page).
International Search Report; International Application No. PCT/FI2005/000211; Date of actual completion of the International Search Sep. 12, 2005; Date of mailing of the International Search Report Sep. 23, 2005 (3 pages).

* cited by examiner

*Primary Examiner* — Matthew J Daniels
*Assistant Examiner* — Jacob Thomas Minskey
(74) *Attorney, Agent, or Firm* — Cantor Colburn LLP

(57) ABSTRACT

The invention relates to a process for the treatment of a fibre material comprising the step of contacting the fibre material in an aqueous medium with a chelating agent and a polymer having following general formula

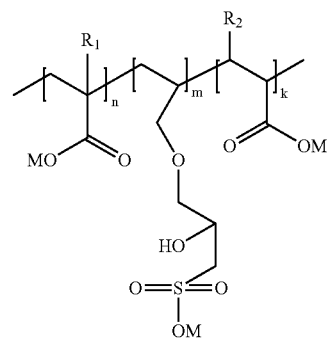

wherein
$R_1$ is a hydrogen atom or an alkyl group containing 1 to 12 carbon atoms,
$R_2$ is —COOM or —CH$_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol.
The invention also relates to a composition comprising a chelating agent and the above polymer.

25 Claims, No Drawings

PROCESS FOR THE TREATMENT OF FIBRE MATERIAL AND NEW COMPOSITION

FIELD OF THE INVENTION

The present invention relates to a process for the treatment of a fibre material, especially a cellulosic fibre material in the presence of a chelating agent and a polymer, and to a composition comprising a chelating agent and a polymer. The composition can be used as a pretreatment in the bleaching with an peroxygen compound of chemical, mechanical, chemi-mechanical and de-inked pulps and in deinking of recycled fibers and in alkaline peroxide bleaching of mechanical, chemical, chemi-mechanical and de-inked pulps. The composition can also be used in deinking of recycled fibers. The composition replaces partly or totally silicate as a stabilizer, especially in the treatment of mechanical and deinked pulps. The present invention also relates to a process for bleaching a cellulosic fibre material with a peroxide compound in an aqueous alkaline medium by using said composition.

DESCRIPTION OF THE RELATED ART

It is well-known that chelating agents can be used as pretreatment for removing harmful metal ions, i.e. generally such transition metal ions as iron and manganese before pulp is bleached with a peroxygen compound, such as hydrogen peroxide, peracetic acid or Caro's acid. In alkaline peroxide bleaching of mechanical pulps, in bleaching of de-inked pulp (DIP) made from recovered waste paper and in the deinking of recovered waste paper, water glass (alkali silicate) and a chelating agent can be added.

Since the common chelating agents such as polyaminopolycarboxylates, e.g. EDTA and DTPA and the corresponding methylenephosphonic acid derivatives of the polyamines are non-biodegradable or show a low biodegradation, there is a target to decrease the use of the common chelating agents as pretreatment agents.

Alkaline silicate solutions normally called water glass have been used in stabilizing hydrogen peroxide solutions, which are used in alkaline peroxide bleaching of mechanical pulps.

Water glass is used alone or together with peroxide in de-inking of recovered papers. Sometimes the de-inked pulp is also bleached with alkaline peroxide.

The use of water glass in alkaline peroxide bleaching of chemical pulps has been published, but the method cannot be utilized in full scale, since the silicate can cause very severe precipitation problems. Another disadvantage with water glass is that when the bleaching liquors are recycled and ultimately fed into the recovery boiler, where the so-called black liquor from the cooking process after concentration is burned, the silicate will cause severe scaling and thus decrease the heat transfer in the recovery boiler, which in worst case can cause an explosion of the recovery boiler. Further the use of the silicate can cause highly dusting.

If the silicates, e.g. in form of the water carry-over, will enter the paper making process, they will disturb the papermaking process, e.g. by precipitating on hot surface, causing holes in the paper reel etc.

It is known that hydrogen peroxide will decompose very rapidly in an alkaline milieu in the presence of transition metal ions. The most abundant of these ions in pulps are iron and manganese. The copper ion is also very detrimental for alkaline hydrogen peroxide, but normally it can enter the process only via used process waters.

It is also known that iron will start to precipitate already below pH 7, first in colloidal form. The formed iron hydroxides, oxyhydroxides etc are much more catalytically active than iron ions. Also manganese can, at least partly, be in precipitated form, but it has been shown that in the presence of hydrogen peroxide, manganese should be in dissolved form.

The theory of the function of water glass varies, but one theory is that water glass will deactivate the catalytic surface of iron and other heavy metal ion "precipitates". In order to avoid the detrimental effect of manganese ions, a chelating agent is often introduced into the bleaching process or the pulp is pretreated with a chelating agent. The most common chelating agents are EDTA and DTPA, which belong to the group of polyaminopolycarboxylates. The corresponding phosphonates, EDTMPA and DTPMPA can also be used, but they are much more expensive than the polyaminopolycarboxylates. They have also the disadvantage that they contain phosphorus, which is not a wanted component, when the environmental regulations are becoming stricter and stricter.

In the deinking of waste paper, water glass has also other functions, e.g. water glass improves ink detachment, it will disperse the ink and act as a buffer keeping the pH constant. Therefore a partly replacement of water glass would also be advantageous and at the same time decrease the precipitation problems connected with the use of water glass.

According to the above there is a need to partly or totally replace water glass (silicates) in alkaline peroxide bleaching processes and in pulping processes, which use water glass, e.g. in alkaline peroxide bleaching of mechanical and de-inked pulps and in de-inking of recovered paper. There have been suggestions to use phosphonates, but they should be used in quite high dosages and the phosphorus problem in the waste waters would still remain. Since the common phosphonates are non-biodegradable, there has been much studies about they adverse effect on mobilizing heavy metals, e.g. from sediments in waterways. If phosphonates would be used, the dosage of these substances should be decreased.

A pretreatment method for bleaching pulp with hydrogen peroxide in alkaline conditions in the presence of sodium silicate and adding 0.05-1% by weight (based on dry pulp) of a copolymer of 3-allyloxy-2-hydroxypropanesulfonic acid (AHPS) and (meth)acrylic acid in the pretreatment is described in the Japanese patent publication JP 1266295 (published 24 Oct. 1989).

According to the Japanese patent application JP 1148890 (published 12 Jun. 1989) the same kind of polymer in an amount of 0.05-1% by weight (based on dry pulp) has been used instead of e.g. DTPA in alkaline peroxide bleaching. In JP 1148890 the bleaching performance of a number of different AHPS-acrylic acid copolymers are shown and compared e.g. with the performance of DTPA.

In the both JP patent applications the tested amounts are very big, since normally the chelating agents are used in an amount of 0.5 to 2 kg per ton pulp as 100% sodium salt.

There are also patents covering the use of poly-alfa-hydroxyacrylic acid (PHAA) instead of water glass, but PHAA is very expensive to produce.

SUMMARY OF THE PRESENT INVENTION

According to the present invention it has now surprisingly been found that by using a copolymer of AHPS and an unsaturated carboxylic acid, such as acrylic acid, methacrylic acid, maleic acid or itaconic acid, together with a chelating agent, either mixed together or added separately, a very good bleaching performance can be achieved and a total replacement of water glass can be achieved, if necessary from the pulping and paper making point of view. Surprisingly, the combination of the copolymer and a chelating agent can very effectively be used as a pretreatment agent before a bleaching of a chemical, mechanical or de-inked pulp with a peroxygen compound, such as hydrogen peroxide, peracetic acid or Caro's acid. The present invention makes it possible to partially or totally replace water glass in bleaching and deinking processes by using the combination of the copolymer and a chelating agent.

The present invention provides a process for treatment of a fibre material comprising the step of contacting the fibre material in an aqueous medium with a chelating agent and the above copolymer. The copolymer and the chelating agent can be added separately or preferably as a ready made mixture (composition).

The present invention also relates to a composition comprising the copolymer and the chelating agent.

The composition and process according to the invention can be used as a pretreatment of all kind of pulps, chemical pulps, mechanical, chemi-mechanical pulps and deinked pulps, which are bleached with alkaline peroxide.

The composition and process according to the invention can also be used in the bleaching of all kind pulps, chemical pulps, mechanical, chemi-mechanical pulps and deinked pulps, which use hydrogen peroxide as the bleaching agent.

The composition and process are also suitable in deinking of recycled pulps, in which water glass and hydrogen peroxide are commonly used.

The composition can also be used in sodium dithionite bleaching of mechanical and de-inked pulps.

The alkaline peroxide bleaching process for mechanical, chemi-mechanical and de-inked pulps according to the invention can be practiced as a single stage of bleaching or in a two-stage process, where the pre-bleached pulp is entering the second stage. Any consistency can be used, but it is most preferable to use medium consistency in the first stage and high consistency in the second stage.

If needed, the bleaching can be preceded by a pretreatment with a chelating agent or preceded by a pretreatment according to the invention in order to reduce the amount of transition metals entering the bleaching process.

In de-inking process the polymer composition can be used in repulping or disperger or in a separate bleaching stage or any process stage where hydrogen peroxide is present.

The composition, either as ready made mixture or as combination of the polymer and chelating agent, can be used as total or partial replacement in those processes, where water glass are commonly used.

The effect of the combination of a chelating agent and the polymer according to the invention in pretreatment may depend on that the common chelating agents, polyaminopolycarboxylates, such as EDTA and DTPA, and polyaminopolymethylenephosphonic acid derivatives, such as EDTMPA and DTPMPA, very strongly chelate transition metal ions such as e.g. iron and manganese ions. The polymers used according to the invention bind very strongly alkaline earth metal ions, especially calcium ions. When the concentration of the alkaline earth metal ions is in very big excess in relation to the transition metal ions as it is often in case when e.g. white water from papermaking process is recycled to the pulping and bleaching operation, the chelating agents are also consumed for binding the alkaline earth metal ions. By addition a very strong calcium binder the amount of a conventional chelating agent can be reduced. Thus also the amount of nitrogen discharged in effluent water will be decreased, which is advantageous for the protection of the environment.

The theory how the polymer and chelating agent will work together is not clear, since the polymer itself cannot stabilize very well alkaline hydrogen peroxide solution and also gives in general poor bleaching performance. The chelating agents stabilize quite well the above mentioned alkaline peroxide, but cannot give a good bleaching result. The common chelating agents mentioned above, will bind the soluble manganese ions in the alkaline peroxide solutions, but since iron is then in solid form, either colloidal or in precipitated form, chelating agents cannot any more bind the solid compounds. The same is valid for the solid forms of manganese compounds. The polymer somehow binds to the solid surfaces or inactivates the catalytic effect of the solid particles. Thus a combined effect will be obtained. The common chelating agents cannot, when used alone, give a good bleaching performance, i.e. for chemical pulps, small viscosity loss and high brightness gain and a sufficient amount of residual peroxide, and for mechanical pulps and deinked pulps high brightness gain and a sufficient amount of residual peroxide, which indicates that peroxide has mainly been consumed for bleaching and not for decomposition processes. Therefore there must be some synergetic effect between the polymers and the common chelating agents used according to the invention.

DETAILED DESCRIPTION OF THE INVENTION

In a first aspect of the present invention there is provided a process for the treatment of a fibre material comprising the step of contacting the fibre material in an aqueous medium with a chelating agent and a polymer having following general formula

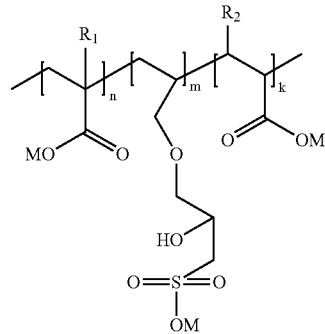

I wherein $R_1$ is a hydrogen atom or an alkyl group containing 1 to 12 carbon atoms, $R_2$ is —COOM or —CH$_2$COOM, M is a hydrogen atom, an alkali metal ion, an alkaline earth metal ion, an ammonium ion or a mixture thereof, n, m and k are molar ratios of corresponding monomers, wherein n is 0 to 0.95, m is 0.05 to 0.9, and k is 0 to 0.8, and (n+m+k) equals 1, and the weight average molecular weight is between 500 and 20,000,000 g/mol.

In a second aspect of the present invention there is provided a composition comprising a chelating agent and a polymer having following formula

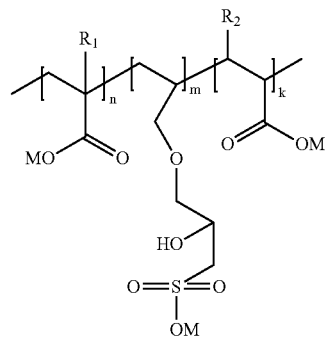

I wherein
$R_1$ is a hydrogen atom or an alkyl group containing 1 to 12 carbon atoms,
$R_2$ is —COOM or —CH$_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol.

The composition of the present invention can be used as a stabilizer in the bleaching of a fibre material in an aqueous medium or as a stabilizer in the deinking of a recycled fibre material.

The above alkali metal ion is preferably sodium or potassium ion, and the alkaline earth metal ion is preferably magnesium ion.

A preferred comonomer with AHPS is acrylic acid ($R_1$=H), methacrylic acid ($R_1$=CH$_3$), maleic acid ($R_2$=COOM) or itaconic acid ($R_2$=CH$_2$COOM). When k is 0 in formula I the preferred comonomer is acrylic acid or methacrylic acid, and when n is 0 the preferred comonomer is maleic acid or itaconic acid. When both k and n are not 0 the preferred comonomers with AHPS are (meth)acrylic acid and maleic acid or itaconic acid.

The monomers are randomly distributed along the polymer chain of formula I, and preferably n is 0.4 to 0.9, m is 0.1 to 0.5, and k is 0 to 0.5.

If the system in pretreatment or in alkaline peroxide bleaching contains high amount of calcium ions, as is the case, when so-called white water from papermaking process is circulated to the pulping and/or bleaching operations, it is advantageous to use maleic acid or itaconic acid (k>0) as one of the comonomers in order to increase the calcium binding ability of the polymer. It is preferable in normal cases that the polymer according to the invention only contains AHPS and a monomer containing one carboxylic acid, such as acrylic acid, since a copolymer comprising multiple monomers is usually more difficult to produce.

The weight average molecular weight of the copolymer of formula I should be between 500 and 20,000,000 g/mol, preferably between 1,000 and 1,000,000 g/mol and most preferably between 2,000 g/mol and 500,000 g/mol.

If the weight average molecular weight is lower than about 500 g/mol, the efficiency of the polymer becomes too low. If the average molecular weight is higher than 20,000,000 g/mol, handling and dosage become a problem due to high viscosity of the polymer solution.

To increase the molecular weight of the copolymer and/or to enhance the efficiency of the copolymer, a cross linker may be used in an amount of 0 to 20% by mole, preferably 0 to 10% by mole, of the total monomer content. Suitable cross linkers are, for example methylenebisacrylamide, ethylene glycol divinyl ether, di(ethylene glycol) divinyl ether, tri(ethylene glycol) divinyl ether and vinyl or allyl terminated polymers, but are not limited to these.

To decrease molecular weight of the copolymer and/or to enhance the efficiency of the copolymer, a chain transfer agent may be used in an amount of 0 to 20% by mole, preferably 0 to 10% by mole, of the total monomer content. Suitable chain transfer agents are, for example thiols (e.g. butylmercaptan) and alcohols (e.g. isopropanol), but are not limited to these.

The chelating agent to be used together with the copolymer of formula I may be a chelating having formula II, III or IV below.

A preferred chelating agent is a compound having following general formula

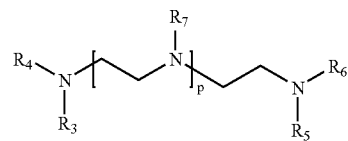

II wherein
p is 0 or an integer of 1 to 10,
$R_3$, $R_4$, $R_5$, $R_6$ and $R_7$ are independently a hydrogen atom or an alkyl chain having 1 to 6 carbon atoms and containing an active chelating ligand, such as a carboxylic, phosphonic or hydroxyl group or a salt thereof.

The alkyl chain is preferably methylene —CH$_2$— or ethylene —CH$_2$CH$_2$—.

In formula II $R_3$, $R_4$, $R_6$ and $R_7$ preferably represent the same group.

Examples of chelating agents according to the above formula II are polyaminopolycarboxylic acids and polyaminopolymethylenephosphonic acids.

The polyaminopolycarboxylic acids can be produced by the conventional route from the polyamine and formaldehyde and sodium cyanide or hydrocyanic acid. The more suitable route for small scale production is to use a haloacetic acid, especially monochloroacetic acid as a reactant.

Preferred polyaminopolycarboxylic acids are:
DTPA: p=1, $R_3$=$R_4$=$R_5$=$R_6$=$R_7$=—CH$_2$COOH
TTHA: p=2, $R_3$=$R_4$=$R_5$=$R_6$=$R_7$=—CH$_2$COOH
EDTA: p=0, $R_3$=$R_4$=$R_5$=$R_6$=—CH$_2$COOH
HEDTA: p=0, $R_3$=$R_4$=$R_5$=—CH$_2$COOH, $R_5$=—CH$_2$CH$_2$OH The polyaminopolymethylenephosphonic acids are made conventionally from the corresponding polyamine, formaldehyde and phosphonic acid. With the higher amines a full substitution with acetic acid groups or methylenphosphonic acid groups will become more and more difficult. These chelating agents will also perform well in the composition but an incomplete substitution will make the chelating agents more prone for decomposition by hydrogen peroxide.

Preferred polyaminopolymethylenephosphonic acids are:
DTPMPA: p=1, $R_3$=$R_4$=$R_5$=$R_6$=$R_7$=—CH$_2$POO$_2$H$_2$
TTHMPA: p=2, $R_3$=$R_4$=$R_5$=$R_6$=$R_7$=—CH$_2$POO$_2$H$_2$
EDTMPA: p=0, $R_3$=$R_4$=$R_5$=$R_6$=—CH$_2$POO$_2$H$_2$ Another preferred chelating agent is a compound having following general formula

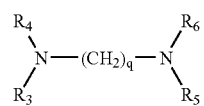

III wherein
q is an integer of 3 to 10,
$R_3$, $R_4$, $R_5$ and $R_6$ are independently a hydrogen atom or an alkyl chain having 1 to 6 carbon atoms and containing an active chelating ligand, such as a carboxylic, phosphonic or hydroxyl group or a salt thereof.

The alkyl chain is preferably methylene —CH$_2$— or ethylene —CH$_2$CH$_2$—.

In formula III $R_3$, $R_4$ and $R_6$ preferably represent the same group.

Examples of chelating agents according to the above formula III are the commercially available hexamethylenediamine tetra(acetic acid) (q=6) and tetramethylenediamine tetra(methylenephosphonic acid) (q=4) having following formulae.

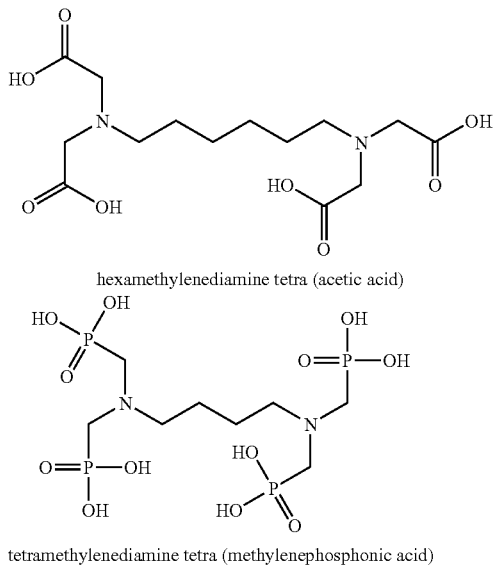

hexamethylenediamine tetra (acetic acid)

tetramethylenediamine tetra (methylenephosphonic acid)

Yet another preferred chelating agent is a compound having following general formula

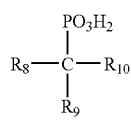    IV wherein
$R_8$ is a hydrogen atom, an alkyl group containing 1 to 6 carbon atoms or an alkyl chain having 1 to 6 carbon atoms and containing a carboxylic, phosphonic or hydroxyl group,
$R_9$ is a hydrogen atom, hydroxyl group, phosphonic group, carboxylic group or alkyl chain having 1 to 6 carbon atoms and containing one or two carboxylic groups, and
$R_{10}$ is a hydrogen atom, hydroxyl group, carboxylic group, alkyl group containing 1 to 6 carbon atoms or alkyl chain having 1 to 6 carbon atoms and containing a carboxylic group, or a salt thereof.

The alkyl chain is preferably methylene —$CH_2$— or ethylene —$CH_2CH_2$—.

An example of the non-nitrogen containing chelating agents according to the above formula IV is 1-hydroxyethylidene-1,1-diphosphonic acid (HEDP).

Though the formulas of the chelating agents are depicted above as acids, they are commercially normally sold as their alkali salts, mainly as their sodium salts and the formulas given above have to be understood as including both the free acids and their salts.

The polymer and the chelating agent can be added separately or as a composition mixture. The weight ratio of the polymer (calculated as solids) to the chelating agent (calculated as 100% chelating agent as sodium salt) is preferably from 1:4 to 4:1, more preferably from 1:3 to 3:1.

The total amount of the polymer (as solids) and the chelating agent (as 100% sodium salt) added separately or as a mixture, is preferably 0.05-10 kg per ton of dry fibre material, more preferably 0.1-5 kg per ton of dry fibre material, and most preferably 0.2 to 4 kg per ton of dry fibre material.

The fibre material is preferably a cellulosic fibre material, especially a chemical, mechanical, chemi-mechanical or deinked pulp. The cellulosic fibre material can also be any regenerated cellulose material, such as viscose, or flax or cotton.

If a composition mixture is made according to the invention, the normal content of active materials in the mixture can be at least 10%, preferably at least 15%, and more preferably at least 20% by weight, but also more diluted solutions can be used in the application process.

In one embodiment of the process of the present invention the treatment comprises bleaching the fibre material with an alkaline peroxide solution in the presence of the chelating agent and the polymer.

The bleaching of chemical pulp can be carried out at temperatures of from 50° C. to 150° C. and at all practical consistencies. The residence time in the bleaching can vary within a wide range, from 30 to 240 minutes, preferably from 45 to 180 minutes and most preferably from 60 to 120 minutes. The residence time will also depend on the temperature used in the bleaching.

The stages can also be reinforced with oxygen, the abbreviation of stages depicted in the professional literature as EOP, Eop, PO or OP.

The peroxide bleaching of mechanical pulps with the process according to the invention can comprise all kind of mechanical pulps, e.g. stone groundwood pulp (SGW), refiner mechanical pulp (RMP), pressure groundwood (PGW), thermo-mechanical pulp (TMP), but also chemically treated high-yield pulps such as chemithermomechanical pulp (CTMP). The invention is also useful in bleaching of deinked pulps. Deinked pulp can be made using mixed office waste (MOW), newsprint (ONP), magazines (OMG) etc. as raw material and the polymer mixture can be used in any process stage where peroxide is used. The invention can also be practiced in refiner bleaching of mechanical pulps and in alkaline peroxide mechanical pulp (APMP), in which wood chips are impregnated with alkaline peroxide solution before refining. In these applications the invention is very advantageous, since the biggest obstacle to use hydrogen peroxide in these applications has been that water glass cannot be used, since they will e.g. fasten to the refiner plates and thus making the process unpractical.

The residence time in the bleaching can vary within a wide range, from 30 to 240 minutes, preferably from 45 to 180 minutes and most preferably from 60 to 120 minutes. The residence time will also depend on the temperature used in the bleaching.

The composition according to the invention can be used as a mixture or the ingredients can be added separately.

The bleaching of mechanical pulps can be carried out at a temperature of from 30° C. to 90° C., preferably at a temperature of from 50° C. to 90° C. The bleaching can be carried out at a consistency of choice, but it is most preferably to carry out the bleaching at a high consistency, i.e. about 30% or higher. Bleaching can also be carried in two stages with a dewatering stage between the stages. The stages can be carried out at a consistency of choice, but it is most preferably to use medium consistency in the first stage and a high consistency in the second stage. This makes it possible to remove the detrimental substances efficiently.

The bleaching stage can be preceded by a chelating agent stage or a pretreatment according to the invention, discussed in more detail below, and dewatering and thus improve the bleaching performance. In the chelating agent stage any of the above defined chelating agents can be used.

The ratio between the alkali and hydrogen peroxide can vary in a wide range, depending on raw materials and degree of bleaching. Also alternative alkali sources, like sodium carbonate, can be utilized. The use of sodium carbonate is especially preferably to use, at least as a partial replacement of sodium hydroxide, when wastepaper is deinked with the total replacement of water glass using the composition according to the invention. The necessary buffer capacity can be ensured in this way.

In another embodiment of the process of the present invention the treatment comprises pretreating the fibre material in the aqueous medium comprising the chelating agent and the polymer.

The pretreatment according to the invention can be utilized for all kind of chemical and mechanical pulps.

The pretreatment can be followed by a bleaching with a peroxygen compound optionally in the presence of the chelating agent and the polymer. The peroxygen compound can be hydrogen peroxide, peracetic acid or Caro's acid.

The pretreatment of chemical pulps can also precede such stages, in which another peroxygen chemical than hydrogen peroxide is used, e.g. a peracetic acid, Caro's acid etc. stage. If the stage is followed by an alkaline stage comprising the use of hydrogen peroxide, the treatment can also carried out after the above mentioned peroxygen stage. Depending on the raw material and the process the treatment can also be carried out only after the mentioned peroxygen stage.

The consistency of this pretreatment is preferably around 10% in order to ensure an efficient metal removal. The pH is preferably from 3 to 7, more preferably from 4 to 6.5 and most preferably from 4.5 to 6. The pretreatment can be carried at any temperature, but it is preferably carried at the same temperature as the bleaching stage, but however below 100° C.

In yet another embodiment of the process of the present invention the treatment comprises de-inking recycled fibre material in the aqueous medium containing the chelating agent and the polymer.

In the de-inking process the polymer composition according to the invention can be used in repulping of wastepaper or in a disperger or in a separate bleaching stage or any process stage where hydrogen peroxide is present.

The pH in the alkaline bleaching, including the de-inking in the presence of hydrogen peroxide, is from 7 to 13, preferably from 7 to 12, and more preferably from 7 to 11.

The present invention is illustrated by following examples, which will not limit the scope of the invention.

In this specification the percentages are % by weight unless otherwise specified. In the tables below the amounts of chemicals given as kg refer to kg per ton dry pulp.

Example 1

Polymerization of AHPS and Acrylic Acid

Preparation of poly(acrylic acid-co-3-allyloxy-2-hydroxypropanesulfonic acid, sodium salt) aqueous solution; a 65:35 (mol) polymer A four-necked glass reactor of 0.25 liters, equipped with a heating/cooling jacket, an overhead stirrer, a thermometer, a reflux condenser, a gas inlet and 2 reagent pumps, was charged with 3-allyloxy-2-hydroxypropanesulfonic acid, sodium salt 40% aqueous solution (95.5 g). The solution was degassed with nitrogen and temperature raised to 85° C. While the solution was stirred, there were pumped at constant rate acrylic acid 50% aqueous solution (46.8 g) within 3 hours, and sodium persulfate 1.3% aqueous solution (47.6 g) within 3 hours and 30 minutes. The addition of the reagent solutions was started simultaneously. After addition of the sodium persulfate solution the reaction mixture was stirred for additional 1 hour and 30 minutes, while maintaining the temperature at 85° C. The reactor was cooled, and slightly yellow and viscous aqueous copolymer solution was obtained.

A sample of the solution was treated with excess of concentrated hydrochloric acid solution to convert the corresponding sodium salts to free acids. Residual 3-allyloxy-2-hydroxypropanesulfonic acid content of the thus obtained solution was determined by gas chromatography, and was approximated to be 2.0% by weight. This refers to 90% conversion of the 3-allyloxy-2-hydroxypropanesulfonic acid, sodium salt monomer.

A sample of the first copolymer solution was neutralized with sodium hydroxide to pH about 10. The molecular weight of the thus obtained copolymer was determined by gel permeation chromatography against poly(acrylic acid, sodium salt) standards. Number and weight average molecular weights were approximated to be 9,000 g/mol and 48,000 g/mol, respectively.

In order to make a preliminary test about the suitability of the stabilizers for alkaline peroxide solutions, stability tests were carried out, i.e. following the decomposition of hydrogen peroxide as a function of time. Since the results very nicely followed the first order kinetics, the results are given as half life time figures. If a very low half life time is obtained, e.g. under some tens of minutes, the product is not suitable for alkaline peroxide bleaching. If the half life time is more than 100 minutes, the product may be suitable in alkaline peroxide bleaching without sodium silicate, but the result does not guarantee a good bleaching performance. Since the transition metal ions, especially in wood abundantly present iron and manganese, will decompose alkaline hydrogen peroxide, the tests were carried out in the presence of these ions.

Example 2

Stability Test of Alkaline Peroxide Solution (Comparison with Dtpa)

A solution containing Fe and Mn (as sulphates, Fe(II) 2 ppm, Mn(II) 2 ppm), polymer (PAHPS-AA prepared in Example 1) and DTPA was prepared and pH adjusted to 10. The temperature was raised to 50° C. The solution was stirred and hydrogen peroxide added in to concentration of 3 g/l. The pH was readjusted to 10, and the hydrogen peroxide concentration measured as a function of time (determined by standard iodometric method). The measurement time was 90 minutes. The half life time of the hydrogen peroxide was thus calculated.

| Substance/Dosage/Half life time t½ | | | | | |
|---|---|---|---|---|---|
| Polymer (as solid) [ppm] | — | 140 | 40 | 75 | 100 |
| DTPA (as 97%) [ppm] | 140 | — | 100 | 65 | 40 |
| t½ [min] | 190 | 15 | 110 | 180 | 220 |

It can be found that the polymer itself has no stabilizing effect on alkaline peroxide bleaching in the presence of iron and manganese ions. The DTPA can stabilize the solution quite well. Surprisingly, a combination of the polymer and DTPA stabilizes the solution better than DTPA alone, though the polymer has no stabilizing effect itself.

Example 3

An industrial TMP (spruce, *picea abies*) pulp was bleached in laboratory using different stabilizers. The detailed reaction conditions and chemical dosages are presented in table below. The pulp contained 6.2 ppm Fe, 16 ppm Mn, 696 ppm Ca, and 2 ppm Cu. The polymerization of PAHPS-AA used in this test is described in example 1. DTPA and DTPMPA used in this test were of commercial grade containing the normal side products of the process.

|  | pulp | | | | | | | |
|---|---|---|---|---|---|---|---|---|
|  | 02077 | 02077 | 02077 | 02077 | 02077 | 02077 | 02077 | 02077 |
|  | | | | test No. | | | | |
|  | 1 | 4 | 5 | 6 | 7 | 8 | 9 | 10 |
| T, C. | 70 | 70 | 70 | 70 | 70 | 70 | 70 | 70 |
| t, min | 120 | 120 | 120 | 120 | 120 | 120 | 120 | 120 |
| Cs, % | 12 | 12 | 12 | 12 | 12 | 12 | 12 | 12 |
| Initial pH | 10.1 | 10.2 | 10.2 | 10.1 | 10.3 | 10.5 | 10.2 | 10.4 |
| H2O2, kg | 30 | 30 | 30 | 30 | 30 | 30 | 30 | 30 |
| NaOH: H2O2 | 0.7 | 0.7 | 0.7 | 0.7 | 0.7 | 0.7 | 0.7 | 0.7 |
| NaOH, kg | 21 | 21 | 21 | 21 | 21 | 21 | 21 | 21 |
| Waterglass: H2O2 | 0.8 | 0 | 0 | 0 | 0 | 0 | 0 | 0 |
| Waterglass, kg | 24 | 0 | 0 | 0 | 0 | 0 | 0 | 0 |
| PAHPS-AA, kg | 0 | 2 | 4 | 4 | 4 | 0 | 4 | 0 |
| DTPA, kg | 0 | 2 | 4 | 1 | 0 | 0 | 0 | 4 |
| DTPMPA, kg | 0 | 0 | 0 | 0 | 1 | 1 | 0 | 0 |
| Residual H2O2, kg | 17.2 | 21.1 | 20.9 | 22.9 | 21.8 | 19.76 | 11.7 | 10.8 |
| Brightness, % ISO | 74.5 | 74.8 | 74.9 | 74 | 74.3 | 74 | 72.3 | 72.4 | result equal to waterglass. The combination of DTPMPA and PAHPS-AA (test No. 7) and the combination of DTPA and PAHPS-AA (test No.s 4, 5 and 6) give good results. However, PAHPS-AA alone (test No. 9) and DTPA alone (test No. 10) give lower brightness with higher peroxide consumption.

Example 4

Bleaching Test with Chemical Pulp

Industrial softwood kraft pulp was chelated and peroxide bleached in laboratory. Detailed reaction conditions and the metals content of the pulp are presented in table below.

| pulp | ref. | 01185 | 01185 | 01185 | 01185 | | 01185 |
|---|---|---|---|---|---|---|---|
| No: | | 210 | 220 | 224 | 226 | | 229 |
| test | Unbleached | Q | Q | Q | Q | | Q |
| t, min | | 30 | 30 | 30 | 30 | | 30 |
| T, C | | 70 | 70 | 70 | 70 | | 70 |
| Cs, % | | 10 | 10 | 10 | 10 | | 10 |
| Intital pH | | 5.5 | 5.5 | 5.5 | 5.5 | | 5.5 |
| Final pH | | 5.8 | 5.8 | 5.7 | 5.7 | | 5.7 |
| DTPA, kg | | 0 | 2.5 | 0 | 0.5 | | 2.5 |
| PAHPS-AA, kg | | 0 | 0 | 2.5 | 0 | | 2.5 |
| Fe, ppm | 17.9 | 7.3 | 14.8 | 10.1 | 7.0 | | 8.2 |
| Mn, ppm | 40.9 | 29.6 | 2.3 | 24.8 | 5.3 | | 3.8 |
| Ca, ppm | 1662 | 1006 | 920 | 1002 | 873 | | 832 |
| | | ↓ | ↓ | ↓ | ↓ | ↓ | ↓ |
| | | P | P | P | P | P | P |
| t, min | | 120 | 120 | 120 | 120 | 120 | 120 |
| T, C | | 90 | 90 | 90 | 90 | 90 | 90 |
| Cs, % | | 12 | 12 | 12 | 12 | 12 | 12 |
| Initial pH | | 10.4 | 10.4 | 10.4 | 10.4 | 10.4 | 10.4 |
| Final pH | | 9.9 | 9.8 | 9.7 | 9.6 | 10.0 | 10.1 |
| NaOH, kg | | 6 | 6 | 6 | 6 | 6 | 6 |
| H2O2, kg | | 15 | 15 | 15 | 15 | 15 | 15 |
| PAHPS-AA, kg | | 0 | 0 | 0 | 0 | 0 | 0 |
| DTPA, kg | | 0 | 0 | 0 | 0 | 2 | 0 |
| Residual H2O2, kg | | 0.0 | 9.2 | 0.0 | 6.9 | 9.2 | 11.4 |
| Residual NaOH, kg | | 1.1 | 4.1 | 0.7 | 0.8 | 2.1 | 2.4 |
| Brightness, % ISO | | 58.9 | 71.2 | 62.0 | 71.4 | 72.1 | 70.2 |
| Kappa number | | 5.7 | 5.1 | 5.2 | 4.8 | 5.1 | 4.7 |
| Viscosity, dm3/kg | | 811 | 849 | 796 | 827 | 872 | 892 |

The results show that PAHPS-AA polymer as such has no significant chelating efficiency. However, the use of stabilizer according to the invention as pre-treatment gives quite satisfying result. Best result was obtained when the stabilizers were added in peroxide bleaching stage.

Example 5

An industrial TMP (spruce, *picea abies*) pulp was bleached in laboratory using waterglass and/or stabilizer according to the invention. The detailed reaction conditions and chemical dosages are presented in table below. The pulp contained 6.2 ppm Fe, 16 ppm Mn, 696 ppm Ca, and 2 ppm Cu. The polymerization of PAHPS-AA used in this test is described in example 1. DTPA used in this test was commercial grade containing the normal side products of the process.

|  | No. | | | |
| --- | --- | --- | --- | --- |
|  | 1 | 2 | 3 | 4 |
| T, C. | 70 | 70 | 70 | 70 |
| t, min | 120 | 120 | 120 | 120 |
| Cs, % | 12 | 12 | 12 | 12 |
| Initial pH | 10.1 | 10.1 | 9.8 | 10.2 |
| Final pH | 8.1 | 7.9 | 7.9 | 7.9 |
| H2O2, kg | 30 | 30 | 30 | 30 |
| NaOH: H2O2 | 0.7 | 0.7 | 0.7 | 0.7 |
| NaOH, kg | 21 | 21 | 21 | 21 |
| Waterglass: H2O2 | 0.8 | 0.4 | 0.2 | 0 |
| Waterglass, kg | 24 | 12 | 6 | 0 |
| PAHPS-AA, kg | 0 | 2 | 2 | 2 |
| DTPA, kg | 0 | 2 | 2 | 2 |
| Residual H2O2, kg | 17.2 | 18.2 | 20.7 | 21.1 |
| Brightness, % ISO | 74.5 | 73.9 | 74.4 | 74.8 |

The results show that partial or total replacement of waterglass gives as good bleaching results as waterglass alone.

Example 6

The TMP sample used in previous examples 3 and 5 was pretreated with stabilizer according to the invention and bleached using the same stabilizer. Normal chelation using DTPA was as reference. The results are shown in table below.

| Trial no. | Q 211 | Q 213 |
| --- | --- | --- |
| T, C. | 60 | 60 |
| t, min | 15 | 15 |
| Cs, % | 5 | 5 |
| Initial pH | 5.5 | 5.5 |
| Final pH | 5.6 | 5.5 |
| PAHPS-AA, kg | 0 | 2 |
| DTPA, kg | 2 | 2 |
|  | ↓ | ↓ |
| Trial no. | P 212 | P 214 |
| T, C. | 70 | 70 |
| t, min | 120 | 120 |
| Cs, % | 12 | 12 |
| Initial pH | 10 | 10.1 |
| H2O2, kg | 30 | 30 |
| NaOH:H2O2 | 0.7 | 0.7 |
| NaOH, kg | 21 | 21 |
| Waterglass, kg | 24 | 0 |
| PAHPS-AA, kg | 0 | 2 |
| DTPA, kg | 0 | 2 |
| Residual H2O2, kg | 19.7 | 21.2 |
| Brightness, % ISO | 74.1 | 74.8 |

The results show that pre-treatment with the stabilizer according to the invention and bleaching using the same stabilizer gives better bleaching results as compared to conventional DTPA treatment.

Example 7

An industrial TMP pulp was bleached in laboratory using waterglass and/or stabilizer according to the invention with different polymer:aminopolycarboxylate ratios. The results are shown in table below. The pulp contained 4 ppm Mn and 5 ppm Fe. The bleaching conditions were: temperature 70° C., bleaching time 120 min, Cs 12%, $H_2O_2$ 30 kg/ton dry pulp and NaOH 30 kg/ton dry pulp.

|  | Experiment No. | | | | | | | |
| --- | --- | --- | --- | --- | --- | --- | --- | --- |
|  | 1 | 2 | 3 | 4 | 5 | 6 | 7 | 8 |
| Initial pH | 10.8 | 10.7 | 11.0 | 10.9 | 10.9 | 10.8 | 10.9 | 10.9 |
| Final pH | 9.7 | 9.8 | 9.9 | 9.9 | 10 | 9.8 | 9.8 | 9.1 |
| Sodium silicate, kg | — | 24 | — | — | — | — | — | — |
| polymer (as solid), kg | — | — | 4 | 3 | 2 | 1 | — | 1 |
| DTPA (as 90%), kg | — | — | — | 1 | 2 | 3 | 4 | 1 |
| Residual $H_2O_2$, kg | 3.0 | 11.2 | 4.9 | 8.2 | 11.8 | 8.7 | 6.2 | 12.5 |
| Brightness, ISO % | 72.6 | 77.1 | 74.7 | 76.2 | 77.4 | 76.1 | 74.2 | 76.9 |

The results show that the combination of polymer and chelating agent gives better result than either of them alone.

Example 8

Bleaching of DIP

An industrial sample of de-inked mixed office waste was bleached in laboratory using waterglass and/or stabilizer according to the invention. The detailed reaction conditions and results are shown in table below.

| Time, min | 80 | 80 | 80 | 80 |
| --- | --- | --- | --- | --- |
| Temperature, C. | 73 | 73 | 73 | 73 |

-continued

| | | | | | |
|---|---|---|---|---|---|
| Consistency, % | | 26 | 26 | 26 | 26 |
| H2O2, kg/tp | | 12 | 12 | 12 | 12 |
| NaOH, kg/tp | | 3.5 | 3.5 | 3.5 | 3.5 |
| Waterglass, kg/tp | | 8 | 0 | 0 | 0 |
| PAHPS-AA | | 0 | 0 | 2 | 1 |
| DTPA, kg | | 0 | 0 | 2 | 2 |
| Residual H2O2, kg/tp | | 6.6 | 0.1 | 7.8 | 2.8 |
| Brightness, % ISO | 85.1 | 90.4 | 87.4 | 90.7 | 89 |
| According to the invention? | | No | No | Yes | Yes |

The results show the beneficial effect of bleaching stabilizer. The bleaching result was about the same with waterglass and stabilizer according to the invention, while bleaching without stabilizer consumes almost all peroxide and brightness is also lower.

The invention claimed is:

1. A process for the treatment of a fibre material comprising contacting the fibre material in an aqueous medium with a chelating agent and a single polymer having the following general formula

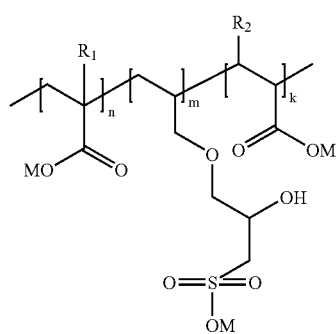

I wherein
$R_1$ is a hydrogen atom or an alkyl group containing 1 to 12 carbon atoms,
$R_2$ is —COOM or —CH$_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol; and
wherein the fibre material is a cellulosic fibre material comprising a chemical, mechanical or chemi-mechanical pulp or a recycled fibre material; and
wherein the weight ratio of the polymer to the chelating agent is from 1:4 to 4:1.

2. The process according to claim 1 wherein the chelating agent and the polymer are introduced as a mixture or the chelating agent and the polymer are introduced separately.

3. The process according to claim 1 wherein the treatment comprises bleaching the fibre material with an alkaline peroxide solution in the presence of the chelating agent and the polymer.

4. The process according to claim 3 wherein the bleaching is preceded by a treatment with a chelating agent.

5. The process according to claim 1, wherein the treatment comprises pretreating the fibre material in the aqueous medium comprising the chelating agent and the polymer.

6. The process according to claim 5 wherein the pH of the aqueous medium in the pretreatment is between 3 and 7.

7. The process according to claim 5 wherein the pretreatment is followed by a bleaching with a peroxygen compound optionally in the presence of the chelating agent and the polymer.

8. The process according to claim 7 wherein the peroxygen compound is hydrogen peroxide, peracetic acid or Caro's acid.

9. The process according to claim 1 wherein the fibre material comprises a recycled fibre material, and wherein the treatment further comprises de-inking the recycled fiber material in the aqueous medium comprising the chelating agent and the polymer.

10. The process according to claim 1 wherein in formula I n is 0.4 to 0.9, m is 0.1 to 0.5, and k is 0 to 0.5.

11. The process according to claim 1 wherein the weight average molecular weight of the copolymer is between 1,000 and 1,000,000 g/mol.

12. The process according to claim 1 wherein the total amount of the chelating agent and the polymer in the treatment is 0.05 to 10 kg per ton of dry fibre material.

13. The process according to claim 1 wherein the polymer is a copolymer of 3-allyloxy-2-hydroxypropanesulfonic acid and at least one of acrylic acid, methacrylic acid, maleic acid, itaconic acid, or a salt thereof.

14. The process according to claim 1 wherein the chelating agent is a compound having the following general formula

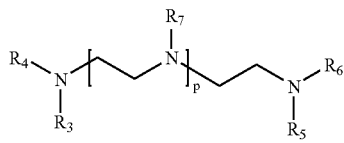

II wherein
p is 0 or an integer of 1 to 10,
$R_3$, $R_4$, $R_5$, $R_6$ and $R_7$ are independently a hydrogen atom or an alkyl chain having 1 to 6 carbon atoms and containing an active chelating ligand.

15. The process according to claim 1 wherein the chelating agent is a compound having the following general formula

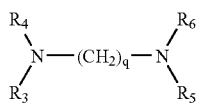

III wherein
q is an integer of 3 to 10,
$R_3$, $R_4$, $R_5$ and $R_6$ are independently a hydrogen atom or an alkyl chain having 1 to 6 carbon atoms and containing an active chelating ligand.

16. The process according to claim 1 wherein the chelating agent is a compound having the following general formula $$R_8 - \underset{\underset{R_9}{|}}{\overset{\overset{PO_3H_2}{|}}{C}} - R_{10}$$

IV wherein
- $R_8$ is a hydrogen atom, an alkyl group containing 1 to 6 carbon atoms or an alkyl chain having 1 to 6 carbon atoms and containing a carboxylic, phosphonic or hydroxyl group,
- $R_9$ is a hydrogen atom, hydroxyl group, phosphonic group, carboxylic group or alkyl chain having 1 to 6 carbon atoms and containing one or two carboxylic groups, and
- $R_{10}$ is a hydrogen atom, hydroxyl group, carboxylic group, alkyl group containing 1 to 6 carbon atoms or alkyl chain having 1 to 6 carbon atoms and containing a carboxylic group, or a salt thereof.

17. The process of claim 1, wherein treatment of the fibre material further comprises bleaching the fibre material in an aqueous medium.

18. The process of claim 1, wherein treatment of the fibre material further comprises deinking of a recycled fibre material.

19. The process of claim 1, wherein k is not zero and n is not zero.

20. A composition comprising a chelating agent and a single polymer having the following general formula

I wherein
- $R_1$ is a hydrogen atom or an alkyl group containing 1 to 12 carbon atoms,
- $R_2$ is —COOM or —CH$_2$COOM,
- M is a hydrogen atom, an alkali metal ion, an alkaline earth metal ion, an ammonium ion or a mixture thereof,
- n, m and k are molar ratios of corresponding monomers, wherein n is 0 to 0.95, m is 0.05 to 0.9, and k is 0 to 0.8, and (n+m+k) equals 1, and
- the weight average molecular weight is between 500 and 20,000,000 g/mol; and wherein the weight ratio of the polymer to the chelating agent is from 1:4 to 4:1; and wherein the chelating agent is
a compound having the following general formula

II $$R_4 \underset{\underset{R_3}{|}}{\overset{}{N}} {\sim} \underset{\underset{}{}}{\overset{\overset{R_7}{|}}{N}}{\Big]}_p {\sim} \underset{\underset{R_5}{|}}{\overset{}{N}} R_6$$

wherein
- p is 0 or an integer of 1 to 10,
- $R_3$, $R_4$, $R_5$, $R_6$ and $R_7$ are independently a hydrogen atom or an alkyl chain having 1 to 6 carbon atoms and containing an active chelating ligand; or a compound having the following general formula

III $$\underset{\underset{R_3}{}}{\overset{\overset{R_4}{}}{N}} - (CH_2)_q - \underset{\underset{R_5}{}}{\overset{\overset{R_6}{}}{N}}$$

wherein
- q is an integer of 3 to 10,
- $R_3$, $R_4$, $R_5$ and $R_6$ are independently a hydrogen atom or an alkyl chain having 1 to 6 carbon atoms and containing an active chelating ligand; or a compound having the following general formula

IV $$R_8 - \underset{\underset{R_9}{|}}{\overset{\overset{PO_3H_2}{|}}{C}} - R_{10}$$

wherein
- $R_8$ is a hydrogen atom, an alkyl group containing 1 to 6 carbon atoms or an alkyl chain having 1 to 6 carbon atoms and containing a carboxylic, phosphonic or hydroxyl group,
- $R_9$ is a hydrogen atom, hydroxyl group, phosphonic group, carboxylic group or alkyl chain having 1 to 6 carbon atoms and containing one or two carboxylic groups, and
- $R_{10}$ is a hydrogen atom, hydroxyl group, carboxylic group, alkyl group containing 1 to 6 carbon atoms or alkyl chain having 1 to 6 carbon atoms and containing a carboxylic group, or a salt thereof.

21. The composition according to claim 20 wherein in formula I n is 0.4 to 0.9, m is 0.1 to 0.5, and k is 0 to 0.5.

22. The composition according to claim 20 wherein the weight average molecular weight of the copolymer is between 1,000 and 1,000,000 g/mol.

23. The composition according to claim 20 wherein the polymer is a copolymer of 3-allyloxy-2-hydroxypropanesulfonic acid and at least one of acrylic acid, methacrylic acid, maleic acid, itaconic acid or a salt thereof.

24. The composition according to claim 20, wherein the chelating agent is a compound having the following general formula

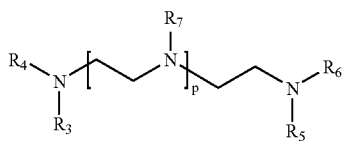
II
wherein
p is 0 or an integer of 1 to 10,
$R_3$, $R_4$, $R_5$, $R_6$ and $R_7$ are independently a hydrogen atom or an alkyl chain having 1 to 6 carbon atoms and containing an active chelating ligand.
25. The composition of claim 20, wherein k is not zero and n is not zero.
* * * * *